(12) United States Patent
Berko

(10) Patent No.: US 12,441,535 B2
(45) Date of Patent: Oct. 14, 2025

(54) ECO-FRIENDLY DETACHABLE CONTAINER/VAULT

(71) Applicant: Roy Berko, Aventura, FL (US)

(72) Inventor: Roy Berko, Aventura, FL (US)

( * ) Notice: Subject to any disclaimer, the term of this patent is extended or adjusted under 35 U.S.C. 154(b) by 0 days.

(21) Appl. No.: 18/177,581

(22) Filed: Mar. 2, 2023

(65) Prior Publication Data
US 2024/0294325 A1   Sep. 5, 2024

(51) Int. Cl.
| | |
|---|---|
| *B65D 88/52* | (2006.01) |
| *B65D 88/00* | (2006.01) |
| *B65D 88/22* | (2006.01) |
| *B65D 90/00* | (2006.01) |
| *B65D 90/02* | (2019.01) |
| *B65D 90/08* | (2006.01) |

(52) U.S. Cl.
CPC ......... *B65D 88/528* (2013.01); *B65D 88/005* (2013.01); *B65D 88/22* (2013.01); *B65D 90/008* (2013.01); *B65D 90/023* (2013.01); *B65D 90/08* (2013.01); *B65D 2211/00* (2013.01); *B65D 2588/12* (2013.01); *B65D 2590/547* (2013.01); *B65D 2590/666* (2013.01)

(58) Field of Classification Search
CPC .... B65D 88/526; B65D 88/528; B65D 90/02; B65D 90/023; B65D 88/005; B65D 90/008; B65D 90/08
See application file for complete search history.

(56) References Cited

U.S. PATENT DOCUMENTS

| | | | | |
|---|---|---|---|---|
| 3,968,895 | A * | 7/1976 | Barnes, Jr. .............. | B65D 7/24 217/15 |
| 4,618,068 | A * | 10/1986 | Born .................... | B65D 88/528 220/4.28 |
| 5,121,710 | A * | 6/1992 | Gonzalez ............... | A01K 1/033 119/498 |
| 5,470,115 | A * | 11/1995 | Berg ....................... | E05B 63/20 292/DIG. 68 |
| 8,960,468 | B2 * | 2/2015 | Boivin .................. | B65D 19/42 220/4.31 |

* cited by examiner

*Primary Examiner* — Andrew T Kirsch
(74) *Attorney, Agent, or Firm* — Defillo & Associates, Inc.; Evelyn A. Defillo

(57) ABSTRACT

An eco-friendly detachable container including a base assembly having a metallic plate attached to a support panel; telescopic corner posts; side panels; a top panel; a first door assembly; a second door assembly; a locking mechanism. The detachable container is vertically adjustable. The support pane, the telescopic corner posts, the side panels, the top panel, the first door assembly, the second door assembly, and the locking mechanism are made entirely from recycled plastic, virgin plastic, or regrind plastic. The metallic plate is made of a recycled aluminum.

9 Claims, 15 Drawing Sheets

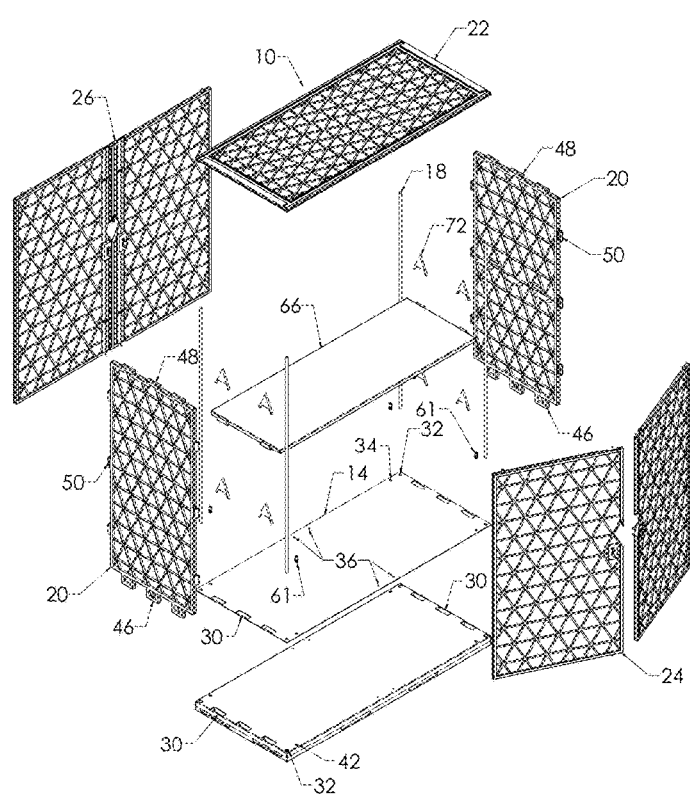
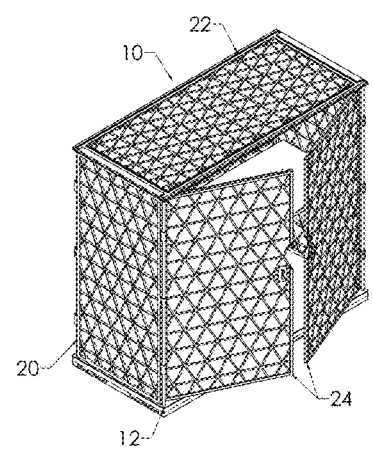
Fig 2
Fig 1

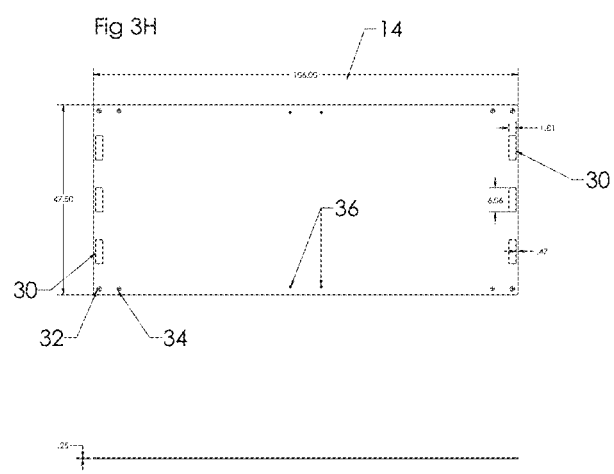
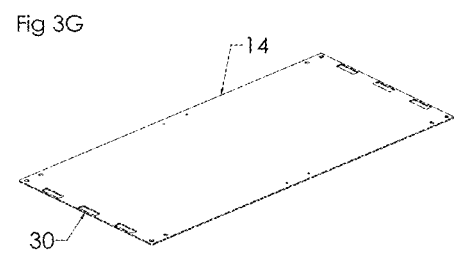
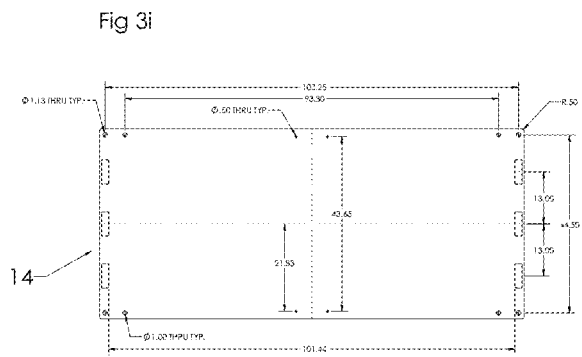

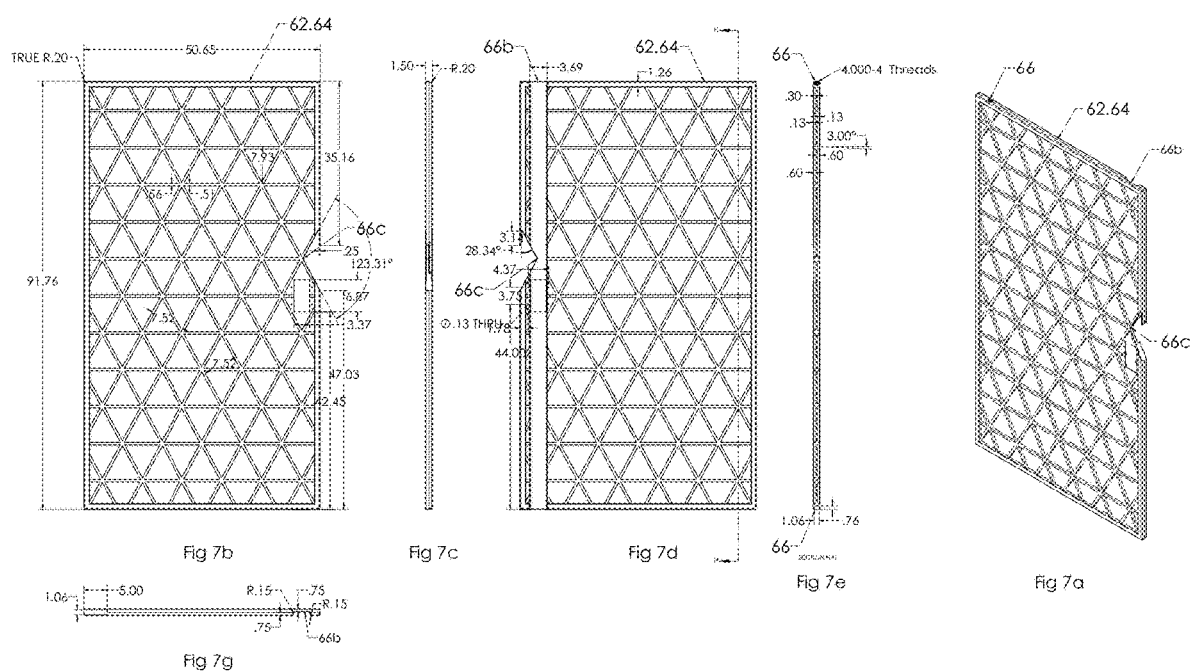

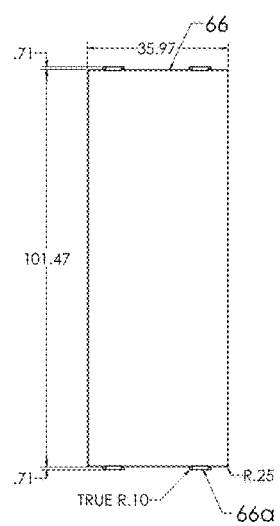
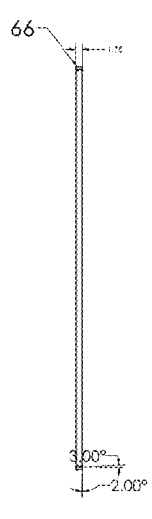
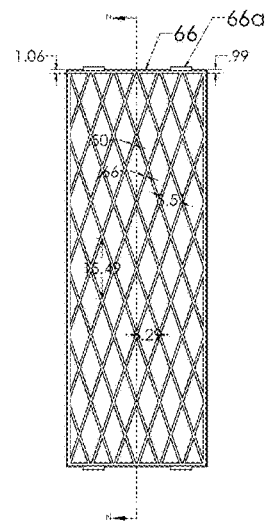
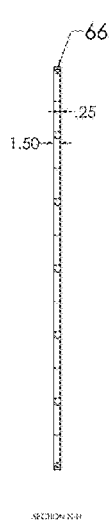
Fig 8b  Fig 8c  Fig 8d  Fig 8e
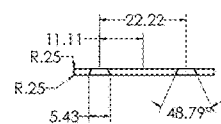
Fig 8f
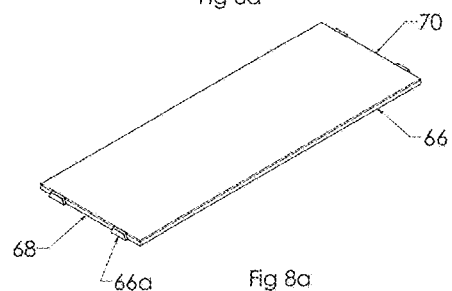
Fig 8a

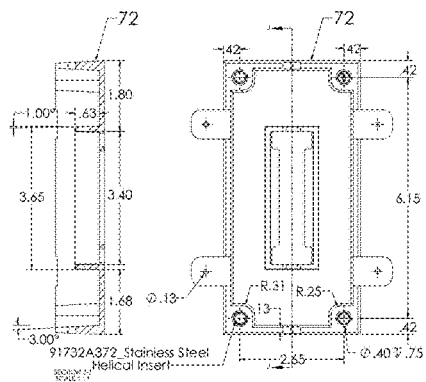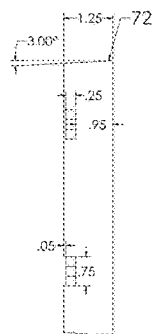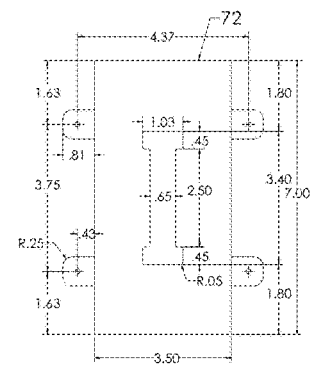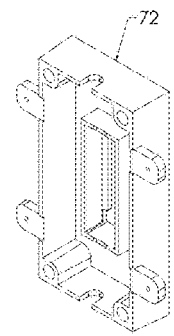
Fig 13b  Fig 13c  Fig 13d  Fig 13e
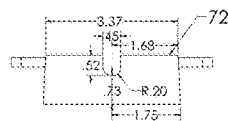
Fig 13f
Fig 13a

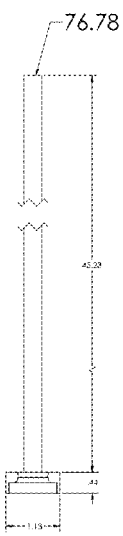
Fig 15b
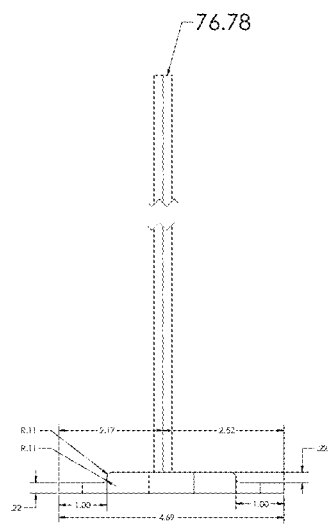
Fig 15c
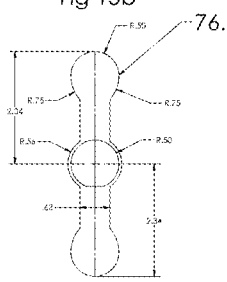
Fig 15d
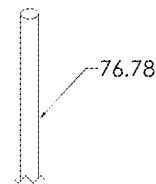
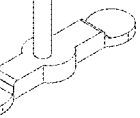
Fig 15a

ECO-FRIENDLY DETACHABLE CONTAINER/VAULT

FIELD OF INVENTION

The present invention relates to a cargo container/vault, in particular, to an eco-friendly detachable container/vault.

BACKGROUND OF THE INVENTION

The use of containers to transport goods/materials is well known in the art. The prior art shows containers having a non-detachable structure. Unfortunately, these containers cannot be detached to save space in the transportation vehicle when the containers are empty, which increases the transportation cost.

In addition, the prior art shows collapsible containers having side and end panels pivotally attached to the base. However, the existing collapsible containers are structurally unstable after assembly and use complicated locking structures that make them difficult to disassemble.

Furthermore, the containers known in the art cannot adjust their height to accommodate the load requirements.

Another problem with the known containers is that they do not allow the quick and easy replacement of damaged panels.

In addition, the known containers do not include tracking devices and/or anti-theft devices to prevent loss of the goods/materials.

Applicant also notes that in today's eco-friendly environment, there is a great increase for the use of "green" products in order to protect the environment.

Therefore, there is a need to provide a detachable container to solve the above problems.

SUMMARY OF THE INVENTION

A detachable container including: a base assembly having a metallic plate attached to a support panel; telescopic corner posts; side panels; a top panel; first door assembly; a second door assembly; a locking mechanism. The base assembly has a shape of a rectangle with two opposite short sides, two opposite long sides, and four corners. The metallic plate has a shape of a rectangle with two opposite short sides, two opposite long sides, and four corners. The metallic plate includes a plurality of first slots on each one of the short sides of the rectangle, a first orifice on each one of the corners of the rectangle, a first hole located on each one of the long sides of the rectangle and near the first orifices, and a first pair of cavities located along each middle section of the long side of the rectangle. The support panel includes a plurality of second slots along each one of the short sides of the rectangle, a second orifice on each one of the corners of the rectangle, a second hole located along each one of the long sides of the rectangle and near the second orifices, and a second pair of cavities located along each middle section of the long side of the rectangle. When the metallic plate is attached to the support panel, the plurality of first slots is aligned with the plurality of second slots of the metallic plate, the first orifices are aligned with the second orifices, the first holes are aligned with the second holes, the first pair of cavities are aligned with the second pair of cavities. The telescopic corner posts are vertically inserted into the aligned first and second orifices of the base assembly. Each side panel is detachably connected to the base assembly and each side panel includes a plurality of protrusions on a lower end, a plurality of projections on an upper end, and a plurality of snap-on clips located on both sides of the side panel.

The detachable container is vertically adjustable.

The support pane, the telescopic corner posts, the side panels, the top panel, the first door assembly, the second door assembly, and the locking mechanism are made entirely from recycled plastic, virgin plastic, or regrind plastic.

The metallic plate is made of a recycled aluminum in order to help protect the environment.

BRIEF DESCRIPTION OF THE DRAWINGS

The accompanying drawings of the present invention are incorporated herein as a part of the specification to facilitate understanding of the present invention.

FIG. 1 shows a perspective front view of the detachable container according to the present invention;

FIG. 2 shows an exploded view of the detachable container of FIG. 1;

FIG. 3f shows a rear view of the support panel of the base assembly of FIG. 3a;

FIG. 3g shows a perspective front view of the metallic base of the detachable container of FIG. 1;

FIG. 3h shows a top view of the metallic base of FIG. 3g including an example of possible measurements;

FIG. 3i shows a bottom view of the metallic base of FIG. 3g including an example of more possible measurements;

FIG. 7a shows a perspective front view of the first gate of the door assembly of the detachable container of FIG. 1;

FIG. 7b shows a front view of the first section of the gate of FIG. 7a including an example of possible measurements;

FIG. 7c shows a right-side view of the first section of the gate of FIG. 7b including an example of possible measurements;

FIG. 7d shows a rear view of the first section of the gate of FIG. 7a including an example of possible measurements;

FIG. 7e shows a right-side view of the first section of the gate of FIG. 7d including an example of possible measurements;

FIG. 7g shows a cross sectional view along line H-H of FIG. 7d including an example of possible measurements;

FIG. 8a shows a perspective front view of the shelf of the detachable container of FIG. 1;

FIG. 8b shows a bottom view of the shell of FIG. 8a including an example of possible measurements;

FIG. 8c shows a side view of the shell of FIG. 8b including an example of possible measurements;

FIG. 8d shows a top view of the shell of FIG. 8a including an example of possible measurements;

FIG. 8e shows a cross sectional view along line N-N of FIG. 8d including an example of possible measurements;

FIG. 8f shows a top view of the shell of FIG. 8b including an example of possible measurements;

FIG. 10b shows a top view of the peg of FIG. 10a;

FIG. 11b shows a top view of the peg of FIG. 11a;

FIG. 12b shows an exploded view of the locking assembly of FIG. 12a;

FIG. 13a shows a perspective front view of the first section of the case of the locking assembly of FIG. 12a;

FIG. 13b shows a cross sectional view along line J-J of FIG. 13c including an example of possible measurements;

FIG. 13c shows a front view of the first section of the case of FIG. 13a including an example of possible measurements;

FIG. 13d shows a side view of the first section of the case of FIG. 13a including an example of possible measurements;

FIG. 13e shows a back view of the first section of the case of FIG. 13a including an example of possible measurements;

FIG. 13f shows a top view of the first section of the case of FIG. 13a including an example of possible measurements;

FIG. 14a shows a perspective front view of the second section of the case of the locking assembly of FIG. 12a;

FIG. 15a shows a perspective front view of the rod lock of the detachable container of FIG. 1;

FIG. 15b shows a side view of the rod lock of FIG. 15a including an example of possible measurements;

FIG. 15c shows a front view of the rod lock of FIG. 15a including an example of possible measurements; and FIG. 15d shows a top view of the rod lock of FIG. 15a including an example of possible measurements.

DETAILED DESCRIPTION OF THE INVENTION

The present invention solves the problems of the prior art by providing a detachable container 10 that is easy to assemble and disassemble to facilitate the transportation process. In addition, the present invention provides a detachable container capable of adjusting height thereof. Furthermore, the present invention is made of materials recovered from waste or scrap in order to protect the environment.

In the present invention the term "virgin plastic" means plastic that has not been recycled before and was made from a resin that was manufactured from natural gas or crude oil.

In the present invention the term "grinded plastic" means ground recycled plastic(s) from accumulated waste or scrap.

In the present invention the term "recycled plastic" means plastic which has come from recycled materials at home or business. For example, plastic bottles, plates, lids, tubes, etc.

Recycling by using waste or scrap material allows to convert these products into useful products, which are often much different than the waste products in their original state. Recycling the waste or scrap materials helps to save energy and landfill space and helps to protect and restore naturally-functioning ecosystems.

One of the benefits of the present invention is that the detachable container can be assembled and put inside current shipping containers with products to be stored. In the present invention, the products can be stored in the detachable container and several detachable containers can be placed inside the current shipping container, making easier the shipping and handling.

Figure 3B:
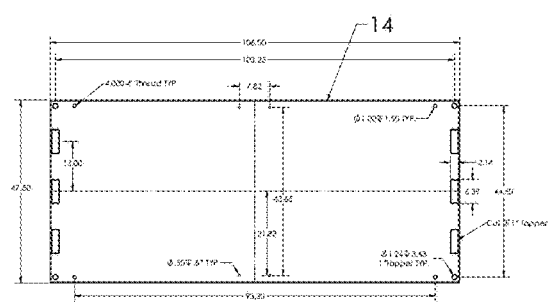
FIG. 3b shows a top view of the base assembly of FIG. 3a including an example of possible measurements.
Figure 3C:
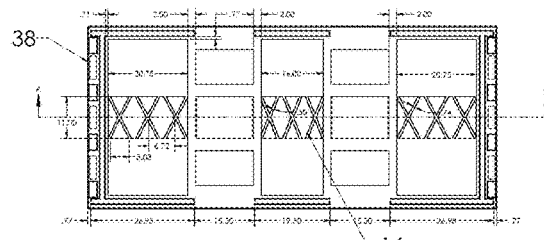
FIG. 3c shows a bottom view of the base assembly of FIG. 3a including an example of possible measurements.
Figure 3D:
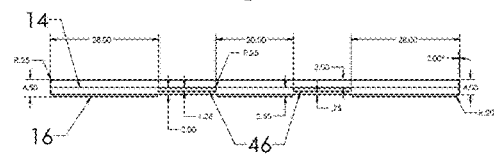
FIG. 3d shows a side view of the base assembly of FIG. 3a including an example of possible measurements.
Figure 3E:
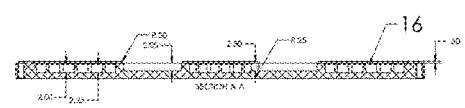
FIG. 3e shows a top cross-sectional view along line A-A of FIG. 3c.
Figure 3F:
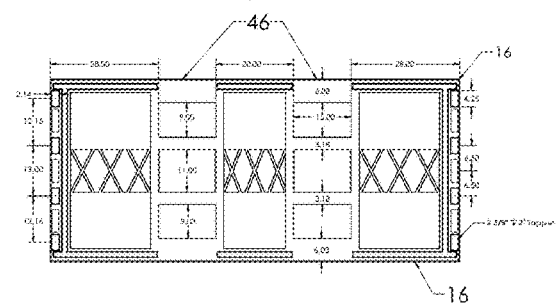
Figure 3A:
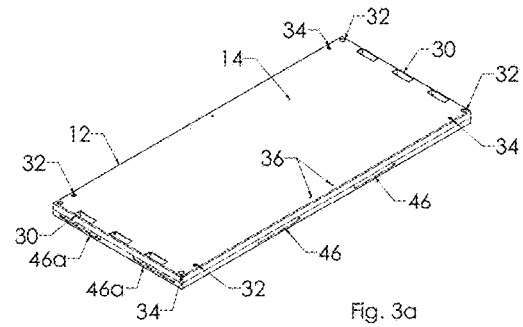
FIG. 3a shows a perspective front view of the base assembly of the detachable container of FIG. 1.
Figure 4B:
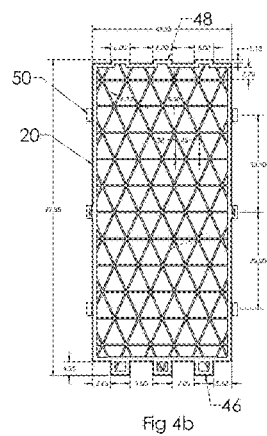
FIG. 4b shows a front view of the side panel FIG. 4a including an example of possible measurements.
Figure 4C:
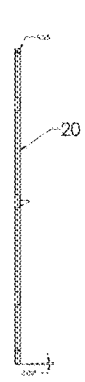
FIG. 4c shows a side view of the side panel of FIG. 4a including an example of possible measurements.
Figure 4D:
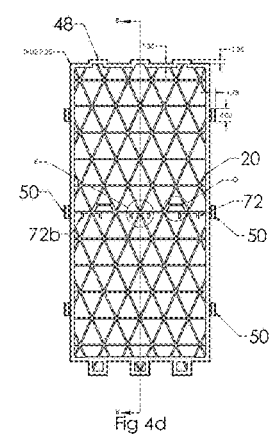
FIG. 4d shows a rear view of the side panels of FIG. 4a including an example of possible measurements.
Figure 4E:
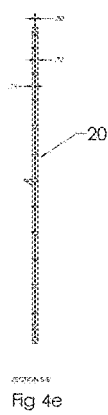
FIG. 4e shows a side cross sectional view along line B-B of FIG. 4d including an example of possible measurements.
Figure 4A:
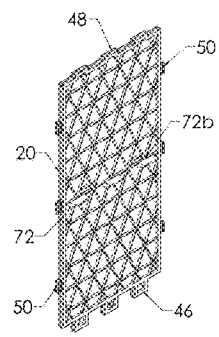
FIG. 4a shows a perspective front view of the side panels of the detachable container of FIG. 1.
Figure 4F:
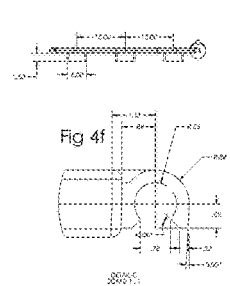
FIG. 4f shows a side view of the snap-on open clip according to the present invention including an example of possible measurements.
Figures 4G, 4H:
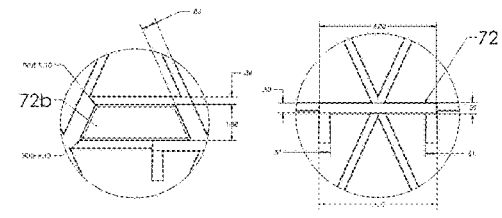
FIG. 4g shows an enlarged view of the area D in FIG. 4d showing the slots of the side panel and including an example of possible measurements.
FIG. 4h shows an enlarged view of the area E in FIG. 4d of the handles/support to use for peg style inserts that mount into the rectangular holes and serve as pegs for the shelves.
Figure 5B:
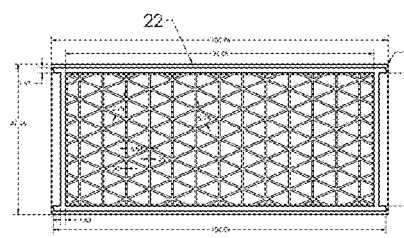
FIG. 5b shows a top view of the top panel of FIG. 5a including an example of possible measurements.
Figure 5C:
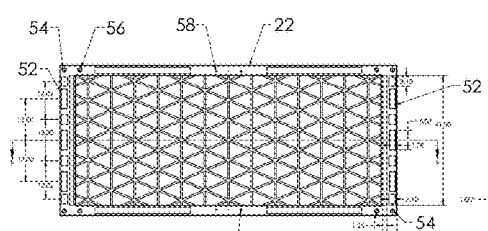
FIG. 5c shows a bottom view of the top panel of FIG. 5a including an example of possible measurements.
Figure 5F:
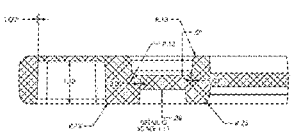
FIG. 5f shows an enlarged view of the area G in FIG. 5e including an example of possible measurements.
Figure 5D:
FIG. 5d shows a side view of the top panel of FIG. 5a including an example of possible measurements.
Figure 5E:
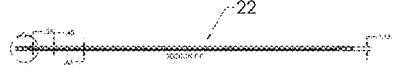
FIG. 5e shows a cross sectional view along line F-F of FIG. 5c including an example of possible measurements.
Figure 5G:
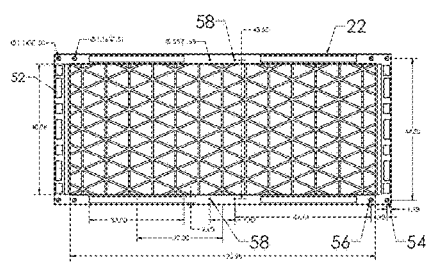
FIG. 5g shows a bottom view of the top cover of FIG. 5a including more examples of possible measurements.
Figure 5A:
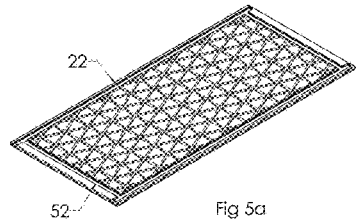
FIG. 5a shows a perspective front view of the top panel of the detachable container of FIG. 1.
Figure 6B:
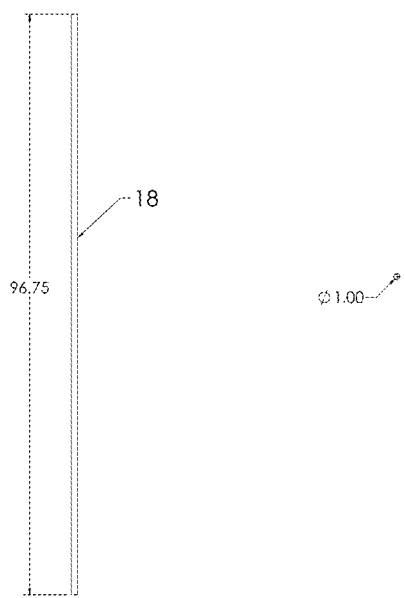
FIG. 6b shows the telescopic pole of FIG. 6a including an example of possible measurements.
Figure 6A:
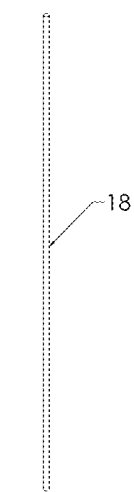
FIG. 6a shows a perspective front view of the telescopic poles of the detachable container of FIG. 1.
Figure 9B:
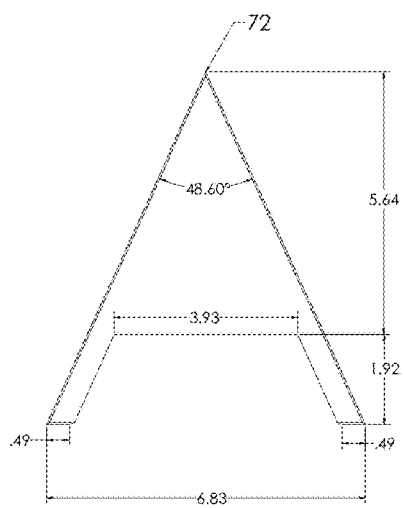
FIG. 9b shows a top view of the supports of FIG. 9a including an example of possible measurements.
Figure 9C:
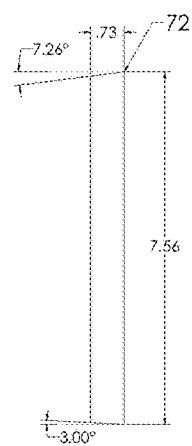
FIG. 9c shows a side view of the supports of FIG. 9a including an example of possible measurements.
Figure 9A:
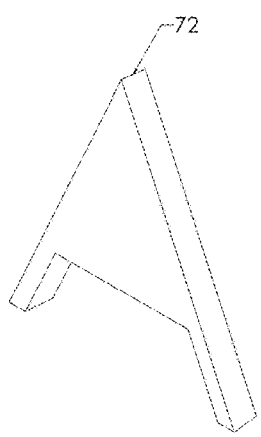
FIG. 9a shows a perspective front view of the supports of the detachable container of FIG. 1.
Figure 10B:
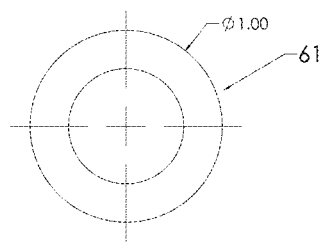
Figure 10C:
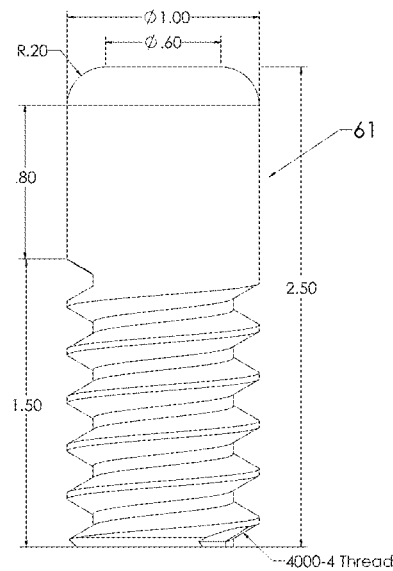
FIG. 10c shows the peg of FIG. 10a including an example of possible measurements.
Figure 10A:
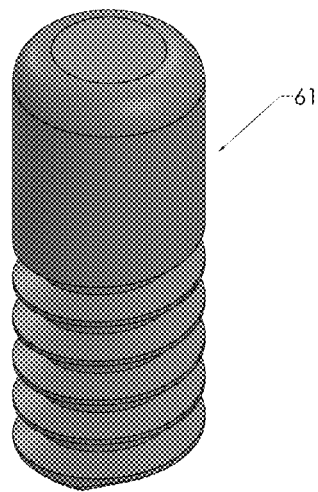
FIG. 10a shows a perspective view of a peg that is attached into the base assembly to be a pivot hinge for the doors.
Figure 11B:
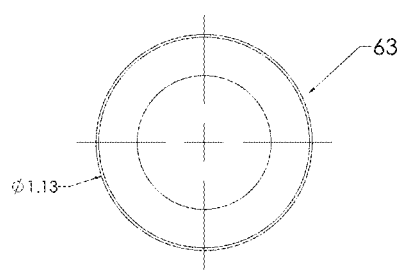
Figure 11C:
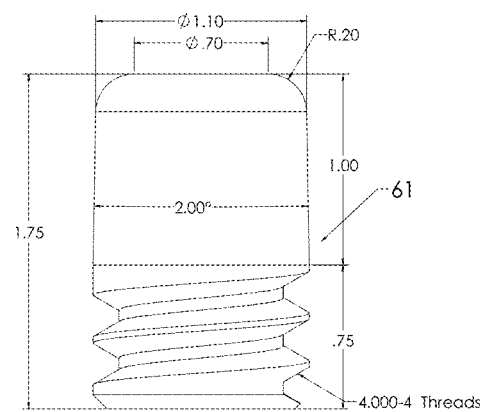
FIG. 11c shows the peg of FIG. 11a including an example of possible measurements.
Figure 11A:
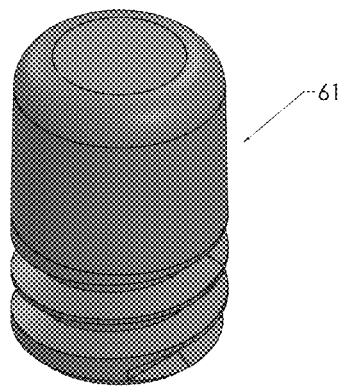
FIG. 11a shows a perspective view of a peg that is attached into the top end of the door panel.
Figure 12B:
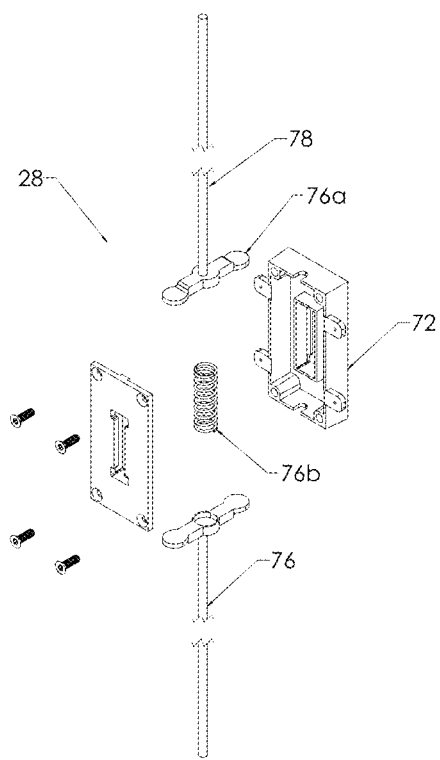
Figure 12A:
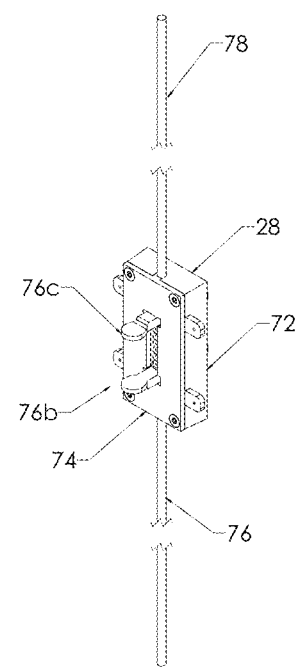
FIG. 12a shows a perspective front view of the locking assembly according to the present invention.
Figure 14B:
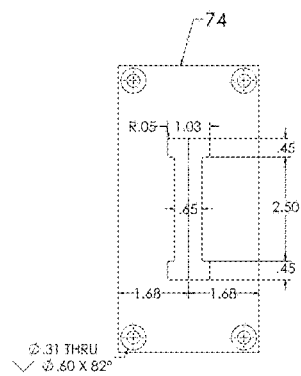
FIG. 14b shows a front view of the second section of the case of FIG. 14a including an example of possible measurements.
Figure 14C:
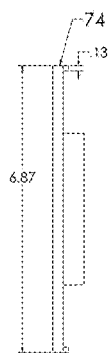
FIG. 14c shows a side view of the second section of the case of FIG. 14a including an example of possible measurements.
Figure 14D:
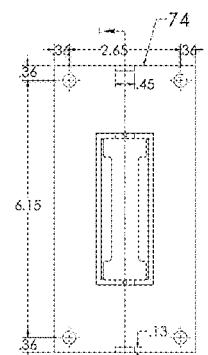
FIG. 14d shows a rear view of the second section of the case of FIG. 14a including an example of possible measurements.
Figure 14E:
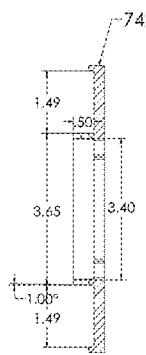
FIG. 14e shows a cross sectional view along line L-L of FIG. 14d including an example of possible measurements.
Figure 14A:
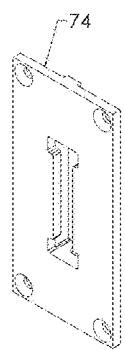
Figure 14F:
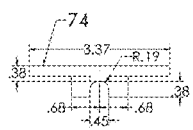
FIG. 14f shows a top view of the second section of the case of FIG. 14a including an example of possible measurements.

FIGS. 1-15 show the detachable container 10 according to the present invention. The detachable container 10 includes a base assembly 12 having a metallic plate 14 attached to a support panel 16, telescopic corner posts 18, side panels 20, a top panel 22, and first door assembly 24, a second door assembly 26, and a locking mechanism 28 (FIG. 12-14).

The Base Assembly

The base assembly 12 includes the metallic plate 14 attached to a support panel 16.

The metallic plate 14 provides strength to the detachable container 10. The metallic plate 14 may preferably have a shape of a rectangle, but other shapes are also possible. The metallic plate 14 may be made of any strong and sturdy metal or metallic alloy, for example, steel, aluminum, stainless steel. In a preferable embodiment, the metallic plate 14 is made of a recycling metal, for example, aluminum, in order to help protect the environment.

In addition, the metallic plate 14 provides protection from dents and scratches from furniture and other storage items.

The metallic plate 14 includes a plurality of slots 30 along each one of the short sides of the rectangle, an orifice 32 on each one of the corners of the rectangle, a hole 34 located along each one of the long sides of the rectangle and near the orifices 32, and a pair of cavities 36 located along each middle section of the long side of the rectangle.

The distance between the orifice 32 and the hole 34 is about 4.98 inches in order to allow the doors to swing in and out.

The support panel 16 is secured to the metallic plate 14 by any means known in the art, for example, bolted or welded. The support panel 16 may have the same shape as the metallic plate 14. The support panel 16 may be made of any strong and sturdy material, preferably plastic or resin.

In a preferable embodiment, the support panel 16 is made of a recycled plastic, virgin plastic, or regrind plastic in order to help protect the environment.

In one embodiment, the support panel 16 has a shape of a rectangle and includes a plurality of slots 38 along each one of the short sides of the rectangle, an orifice 40 on each one of the corners of the rectangle, a hole 42 located along each one of the long sides of the rectangle and near the orifices 40, and a pair of cavities 44 located along each middle section of the long side of the rectangle.

When the metallic plate 14 is attached to the support panel 16, the plurality of slots 38 are aligned with the plurality of slots 30 of the metallic plate 14, the orifices 40 are aligned with the orifices 32, the holes 42 are aligned with the holes 34, the cavities 44 are aligned with the cavities 36.

The support panel 16 may include two channels 46 each one of the front and back side and two channels 46a in both sides of the support plate 16 in order to accommodate the forks of a forklift. Having the channels 46, 46a in all sides of the support plate 16 allows the user to use the forklift from all directions providing a great flexibility.

The Telescopic Corner Posts

The corner posts 18 are vertically inserted into the aligned orifices 32, 40 of the base assembly 12. The corner posts are telescopic; thus, the size of the detachable container 12 can be set at the desired height.

The corner post 18 may be made of any strong and sturdy material, preferably plastic or resin.

In a preferable embodiment, the corner posts 18 are made of a recycled plastic, virgin plastic, or regrind plastic in order to help protect the environment.

Side Panels

The side panels 20 are detachably connected to the base assembly 12. The side panels 20 include a plurality of protrusions 48 on the lower end, a plurality of projections 48 on the upper end, and a plurality of snap-on clips 50 located on both sides of the side panels 20.

The plurality of protrusions 48 of the side panels 20 are detachably connected to the corresponding aligned slots 30, 38 of the base assembly 12. Then, the side panels 20 are secured to the adjacent telescopic corner posts 18 by the snap-on clips 50.

The protrusions 48 are of the same shape of the aligned slots 30,38 of the base assembly 12. The number of protrusions 48 are equal to the number of aligned slots 30, 38.

The side panels 20 can be made of any sturdy material, for example, a plastic material such as polyethylene or Polyvinyl Chloride (PVC), Nylon, or High-Density Polyethylene (HDPE).

In a preferable embodiment, the side panels 20 are made of a recycled plastic, virgin plastic, or regrind plastic in order to help protect the environment.

The side panels 20 may have a shape compatible with the base assembly 12 and a height compatible with the height of the telescopic corner posts 18.

As can be seen in FIG. 4a-h the side panel 20 may include handles/support 72 and slots 72b in order to attach the shelf into the side panel.

The handles/supports 72 allow the shelf to rest on.

The slots 72b receive the protrusions 66a of the shelf into the side panel.

Top Panel

The top panel 22 may have the same shape as the base assembly 12. The size of the top panel 22 may be slightly bigger than the base assembly 12 in order to accommodate the side panels 20 and telescopic corner posts 18.

The top panel 22 includes a plurality of slots 52 on each one of the short sides of the rectangle, an orifice 54 on each one of the corners of the rectangle, a hole 56 located along each one of the long sides of the rectangle and near the orifices 54, and a pair of cavities 58 located along each middle section of the long side of the rectangle.

The plurality of slots 52 connected to the plurality of projections 48 on the upper end of the side panel 20. The orifices 54 are connected to the corresponding upper end of the telescopic corner port 18.

The top panel 22 can be made of any sturdy material, for example, a plastic material such as polyethylene or Polyvinyl Chloride (PVC) Nylon, or High-Density Polyethylene (HDPE).

In a preferable embodiment, the top panel 22 is made of a recycled plastic, virgin plastic, or regrind plastic in order to help protect the environment.

The size and shape of the plurality of slots 52 and orifices 54 may correspond to the size and shape of the plurality of projections 48 and the upper end of the telescopic corner port 18 respectively.

Door Assemblies

The detachable container 10 includes a first door assembly 24 and a second door assembly 26 detachably connected to the base assembly 12 and the top panel 22. The first door assembly 24 and a second door assembly 26 are identical and are located opposite to each other and on the long sides of the base assembly 12. Having the two door assemblies 24, 26, allows the user to easily access the content of the detachable container from different points (back and front).

The first door assembly 24 includes a first gate 62 and a second gate 64. The first gate 62 and the second gate 64 are a mirror image of each other. The first gate 62 is detachably connected to one side on the long side of the base assembly 12 and the second gate 64 is detachably connected to the other side.

The first gate 62 and the second gate 64 may be made of any strong and sturdy material, preferably plastic or resin.

In a preferable embodiment, the first gate 62 and the second gate 64 are made of a recycled plastic, virgin plastic, or regrind plastic in order to help protect the environment.

Each one of the first gate 62 and the second gate 64 includes pins 66 protruding from their lower end and upper end and a channel 66b on the side opposite to the pins 66.

The pins 66 on the lower end of the first gate 62 and the second gate 64 are detachably connected to the corresponding aligned holes 34, 42 and the channels 66b are detachably connected to the corresponding aligned cavities 36, 44 of the base assembly 12.

The plurality of pins 66 on the upper end of the first gate 62 and the second gate 64 are detachably connected to the corresponding hole 56 of the top panel 22 and the corresponding cavity 58 of the top panel 22.

The opening 66c in the middle section of the doors are designed to introduce a padlock to keep the doors locked and the merchandise secured. The openings 66c also allow accessibility to the padlock from both sides of the doors.

The distance between the aligned orifices 32, 40 and the aligned holes 34, 42 is very important to allow the gates to open and close. The distance between the aligned orifices 32, 40 and the aligned holes 34, 42 is 4.98 inches.

The first gate 62 and the second gate 64 interlock with one another.

The structure of the second door assembly 26 is the same as that of the first door assembly 24.

Pegs 61 are attached into the base assembly 12 to be a pivot hinge for the doors.

Dowel pins 63 are attached into the top end of the door panel.

Shelf

The detachable container 10 may include at least one shelf 66 located in the inner space created by the side walls 20, the top panel 22, the base assembly 12, the telescopic corner post 18, the first door assembly 24 and the second door assembly 26.

Each shelf 66 has a first side 68 connected to the corresponding side wall 20 and a second end 70 connected to the other side wall 20.

The shelf 68 is mounted on the side walls by support 72. The support 72 may have any geometrical shape, preferably a triangular shape.

The protrusions 66a of the shelf 68 are connected to the slots 72b of the side wall 20.

The shelves 66 and the supports 72 may be made of any strong and sturdy material, preferably plastic or resin.

In a preferable embodiment, shelves 66 and the supports 72 are made of a recycled plastic, virgin plastic, or regrind plastic in order to help protect the environment.

Locking Mechanism

The locking mechanism 28 locks the first gate 62 and second gate 64 of the corresponding first and second door assemblies 24, 26.

All of the elements of the locking mechanism 28 may be made of any strong and sturdy material, preferably plastic or resin.

In a preferable embodiment, all of the elements of the locking mechanism 28 are made of a recycled plastic, virgin plastic, or regrind plastic in order to help protect the environment.

The locking mechanism 28 includes a case 72, a cover 74, a first locking rod 76, a second locking rod 78, a spring 80 located inside the case 72, and a vertical aperture 82 located on the cover 74.

The first locking rod 76 and the second locking rod 78 are identical.

To release the rod (76, 78) from the roof and bottom pieces, the tabs 76b, 78b are squeezed inwards.

In an embodiment, the detachable container 10 may include attached to the side panels, a locking mechanism, or gate assemblies, and at least one of the following devices to provide security to the detachable container: a key pad, a biometric scanner, a camera, a face scanner, a remote access device, and an alarm system with notifications and alerts. All of the mentioned devices are well known in the art and there is not a need to explain how they work.

In an embodiment, the detachable container 10 may include attached to the side panels, a locking mechanism, or gate assemblies, and at least one of the following devices: a magnetized buoyancy solution for weight distribution; a magnetized platform on trailer and warehouses to maneuver; a magnetized door with remote access; a magnetized base undercarriage on containers/vaults; and a foot pedal to raise base and expose wheels for tight maneuvering. All the mentioned devices are well known in the art and there is not a need to explain how they work.

When the detachable container 10 needs to be disassembled, the top panel 22 may be detached from the side walls 20, telescopic corner posts 18, and door assemblies 24, 26; then the door assemblies 24, 26 may be detached from the base assembly 12; then the side walls 20 may be detached from the telescopic corner posts 18 and the base assembly 12; then, the telescopic corner posts 18 may be removed from the base assembly; then all of the panels and telescopic corner posts are stacked on the base assembly. Therefore, in the process of returning empty containers, each of the containers can be detached and form a whole piece, to reduce the space occupied.

The above description is only a preferred embodiment of the present invention, and the scope of protection of the present invention is not limited to the above embodiments.

The invention claimed is:

1. An eco-friendly detachable container comprising:
   a base assembly having a metallic plate attached to a support panel, wherein the support panel includes a plurality of corners, wherein the metallic plate includes a plurality of corners;
   telescopic corner posts;
   side panels;
   a top panel having a plurality of corners;
   a first door assembly;
   a second door assembly;
   a locking mechanism;
   wherein each one of the first door assembly and the second door assembly includes a first gate and a second gate, wherein the first gate includes an opening located on a middle section of the first gate and the second gate includes an opening located in a middle section of the second gate;
   wherein the locking mechanism locks the first gate and the second gate of the corresponding door assembly;
   wherein the metallic plate includes a plurality of first slots, a first orifice on each one of the plurality of corners, a first hole located near the corresponding first orifice, and a first pair of cavities along a middle section of the metallic plate;
   wherein the support panel includes a plurality of second slots, a second orifice on each one of the plurality of corners, a second hole located near the second orifices, and a second pair of cavities along a middle section of the support panel;
   wherein when the metallic plate is attached to the support panel, the plurality of first slots of the metallic plate is aligned with the plurality of second slots of the support panel, the first orifices are aligned with the second orifices, the first holes are aligned with the second holes, the first pair of cavities are aligned with the second pair of cavities;

wherein the top panel includes a plurality of third slots, a third orifice on each one of the plurality of corners, a third hole located near the third orifices, and a pair of third cavities along a middle section of the top panel;

wherein the telescopic corner posts are located between the top panel and the support panel, the telescopic corner posts are vertically inserted into the aligned first and second orifices of the base assembly and into the corresponding third orifice of the top panel, each one of the telescopic corner posts are removable from the base assembly and the top panel;

wherein each one of the side panels is detachably connected to the base assembly and each one of the side panels includes a plurality of protrusions on a lower end, a plurality of projections on an upper end, a plurality of snap-on clips located on both sides of each one of the side panels, the plurality of snap-on clips connect the side panels to the corresponding telescopic corner post, the plurality of protrusions of the side panel are connected to a corresponding aligned slot of the base assembly, the plurality of projections connect the side panels to the top panel;

wherein the detachable container is vertically adjustable;

wherein the side panels, the top panel, the support panel, and the telescopic corner posts are made of plastic; and wherein in a disassembled position:
the plurality of projections is detached from the side panels;
the plurality of protrusions of the side panels are detached from the corresponding aligned slots of the base assembly, the plurality of snap-on clips are detached from the corresponding telescopic corner post,
the telescopic corner posts are detached from the first and the second orifices of the base assembly and from the corresponding third orifice of the top panel,
the first and the second door assemblies are detached from the base assembly;
then the top panel, the side panels, the telescopic corner posts, and the first and second door assembly are stacked on the base assembly.

2. The eco-friendly detachable container according to claim 1, wherein the top panel has a shape of a rectangle with two opposite short sides, two opposite long sides, and four corners.

3. The eco-friendly detachable container according to claim 1, wherein the first door assembly and the second door assembly are located opposite to each other.

4. The eco-friendly detachable container according to claim 1, wherein each one of the first gate and the second gate has a plurality of pins protruding from an upper end and a lower end, the plurality of pins is detachably connected to the corresponding aligned first and second holes and corresponding aligned first and second cavities of the base assembly.

5. The eco-friendly detachable container according to claim 1, further comprising an inside shelf.

6. The eco-friendly detachable container according to claim 1, wherein the support panel includes two channels.

7. The detachable container according to claim 1, wherein the panels include support and slots.

8. An eco-friendly detachable container consisting of:
a base assembly having a metallic plate attached to a support panel, wherein the support panel includes a plurality of corners, wherein the metallic plate includes a plurality of corners;
telescopic corner posts;
side panels;
a top panel having a plurality of corners;
a first door assembly;
a second door assembly;
a locking mechanism;
pegs attached to the base assembly;
wherein the locking mechanism includes a case, a cover, a first locking rod located on a top section of the case and having a first end inside the case, a second locking rod located on a bottom section of the case and having a first end inside the case, a spring located inside the case, and a vertical aperture located on the cover, wherein a tab protrudes from the first end of the first locking rod and is housed inside the case, wherein a tab protrudes from the first end of the second locking rod and is housed inside the case, wherein the spring is located between the tab of the first end of the first locking rod and the tab of the first end of the second locking rod;
wherein the metallic plate includes a plurality of first slots, a first orifice on each one of the plurality of corners, a first hole near the first orifices, and a first pair of cavities along a middle section of the metallic plate;
wherein the support panel includes a plurality of second slots, a second orifice on each one of the plurality of corners, a second hole located near the second orifices, and a second pair of cavities along a middle section of the support panel;
wherein when the metallic plate is attached to the support panel, the plurality of first slots is aligned with the plurality of second slots of the support panel, the first orifices are aligned with the second orifices, the first holes are aligned with the second holes, the first pair of cavities are aligned with the second pair of cavities;
wherein the top panel includes a plurality of third slots, a third orifice on each one of the plurality of corners, a third hole located near the third orifices, and a pair of third cavities located along a middle section of the top panel;
wherein the telescopic corner posts are located between the top panel and the support panel, the telescopic corner posts are vertically inserted into the aligned first and second orifices of the base assembly and into the corresponding third orifice of the top panel, each one of the telescopic corner posts are removable from the base assembly and the top panel;
wherein each one of the side panels are detachably connected to the base assembly and each side panel includes a plurality of protrusions on a lower end, a plurality of projections on an upper end, a plurality of snap-on clips located on both sides of each one of the side panels, the plurality of snap-on clips connect the side panels to the corresponding telescopic corner post, the plurality of protrusions of the side panel are connected to a corresponding aligned slot of the base assembly, the plurality of projections connect the side panels to the top panel;
wherein the detachable container is vertically adjustable;
wherein the support panel, the telescopic corner posts, the side panels, the top panel, the first door assembly, the second door assembly, and the case of the locking mechanism are made entirely from recycled plastic, virgin plastic, or regrind plastic;

wherein the metallic plate is made of a recycled aluminum; and wherein in a disassembled position:

the plurality of projections is detached from the side panels;

the plurality of protrusions of the side panels are detached from the corresponding aligned slots of the base assembly, the plurality of snap-on clips are detached from the corresponding telescopic corner post, the telescopic corner posts are detached from the first and the second orifices of the base assembly and from the corresponding third orifice of the top panel, the first and the second door assemblies are detached from the base assembly;

then the top panel, the side panels, the telescopic corner posts, and the first and second door assembly are stacked on the base assembly.

9. An eco-friendly detachable container consisting of:

a base assembly having a metallic plate attached to a support panel, wherein the support panel includes a plurality of corners, wherein the metallic plate includes a plurality of corners;

telescopic corner posts;

side panels;

a top panel having a plurality of corners;

a first door assembly;

a second door assembly;

a locking mechanism;

a keypad, a biometric scanner, a camera, a face scanner, a remote access device, or an alarm system;

a magnetized buoyancy solution; a magnetized platform; a magnetized door with remote access; or a magnetized undercarriage;

wherein the locking mechanism includes a case, a cover, a first locking rod located on a top section of the case and having a first end inside the case, a second locking rod located on a bottom section of the case and having a first end inside the case, a spring located inside the case, and a vertical aperture located on the cover, wherein a tab protrudes from the first end of the first locking rod and is housed inside the case, wherein a tab protrudes from the first end of the second locking rod and is housed inside the case, wherein the spring is located between the tab of the first end of the first locking rod and the tab of the first end of the second locking rod;

wherein each one of the first door assembly and the second door assembly includes a first gate and a second gate, wherein each one of the first gate and the second gate includes an opening located in a middle section of the gate;

wherein the metallic plate includes a plurality of first slots, a first orifice on each one of the plurality of corners, a first hole near the first orifices, and a first pair of cavities along a middle section of the metallic plate;

wherein the support panel includes a plurality of second slots, a second orifice on each one of the plurality of corners, a second hole near the second orifices, and a second pair of cavities along a middle section of the support plate;

wherein when the metallic plate is attached to the support panel, the plurality of first slots is aligned with the plurality of second slots of the support panel, the first orifices are aligned with the second orifices, the first holes are aligned with the second holes, the first pair of cavities of the metallic plate are aligned with the second pair of cavities of the support plate;

wherein the top panel includes a plurality of third slots, a third orifice on each one of the corners, a third hole located near the third orifices, and a pair of third cavities along a middle section of the top panel;

wherein each one of the side panels is detachably connected to the base assembly and each one of the side panels includes a plurality of protrusions on a lower end and a plurality of projection on an upper end;

wherein the telescopic corner posts are located between the top panel and the support panel, the telescopic corner posts are vertically inserted into the aligned first and second orifices of the base assembly and into the corresponding third orifice of the top panel, each one of the telescopic corner posts are removable from the base assembly and the top panel, a plurality of snap-on clips connects the side panels to the corresponding telescopic corner post, the plurality of protrusions of the side panel are connected to a corresponding aligned slot of the base assembly, the plurality of projections of the side panels connect the side panels to the top panel;

wherein the detachable container is vertically adjustable; and wherein in a disassembled position:

the plurality of projections is detached from the side panels;

the plurality of protrusions of the side panels are detached from the corresponding aligned slots of the base assembly, the plurality of snap-on clips are detached from the corresponding telescopic corner post, the telescopic corner posts are detached from the first and the second orifices of the base assembly and from the corresponding third orifice of the top panel, the first and the second door assemblies are detached from the base assembly;

then the top panel, the side panels, the telescopic corner posts, and the first and second door assembly are stacked on the base assembly.

\* \* \* \* \*